R. MURDOCH.
Running-Gear.
No. 29,093. Patented July 10, 1860.
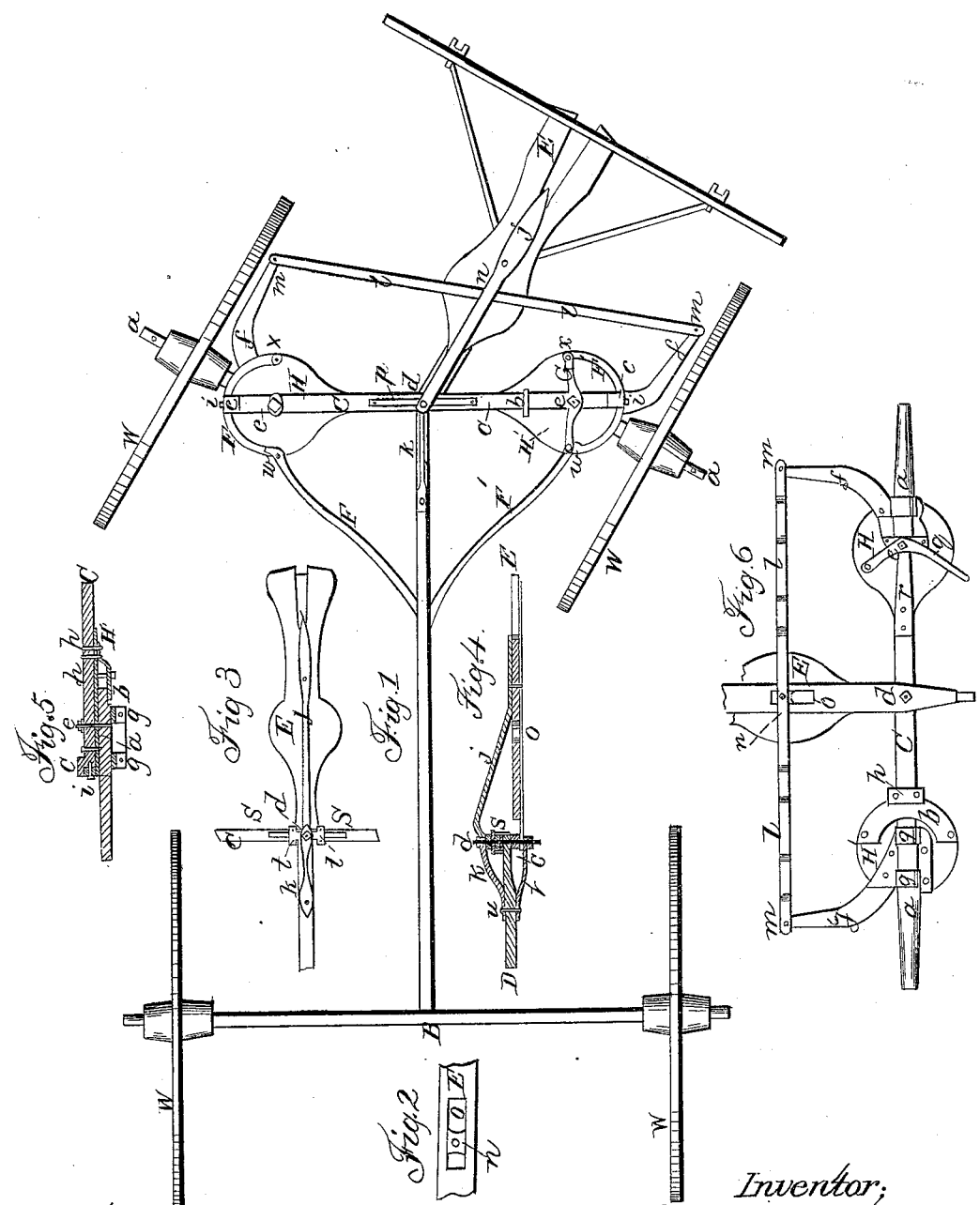
Witnesses
Grenville Lewis
Jno. W. Chile
Inventor;
Richard Murdoch
by his Attorney
Chas. F. Stansbury

UNITED STATES PATENT OFFICE.

RICHARD MURDOCH, OF BALTIMORE, MARYLAND.

RUNNING-GEAR OF VEHICLES.

Specification of Letters Patent No. 29,093, dated July 10, 1860.

*To all whom it may concern:*

Be it known that I, RICHARD MURDOCH, of the city of Baltimore, in the State of Maryland, have invented certain Improvements in the Running-Gear of Carriages; and I do hereby declare the following to be a correct description of the same, reference being had to the accompanying drawings, in which—
Figure 1 is a top view or plan of my improved running gear, and Figs. 2, 3, 4, 5 and 6 are details.

The same part, wherever it occurs, is marked by the same letter of reference.
My invention consists in various improvements in the details of the running gear for carriages for which patents have heretofore been granted to me, viz., on the 24th of June, 1856, and the 19th of May, 1857, and relates mainly to the mode of bracing the short axles so as to give them firm support in every position, and further to a mode of supporting the king bolts and attaching the springs to the axletree and relieving the sliding pivot or bolt from wear—all as hereinafter more particularly set forth.

It is very important in running gear working on the principle of those patented by me to secure the short axles so that they will be perfectly firm in every position that they assume when the vehicle is turning. I have adopted several modes of bracing and supporting them which are described and shown in the specifications of my previous patents; but the modes I now adopt are more effectual than those I have heretofore used, and are satisfactory in practice.

To enable others to make and use my improvements, I will now proceed to describe them with reference to the drawings, in which—

W marks the wheels of the vehicle; B the rear axletree; D the perch, and E the pole socket. The ordinary front axletree I replace by a transverse bar C which I call the bed. To this are pivoted at *e*, *e*, the short axles *a a* which are operated in the manner and by the connections described and shown in my patent of the 19th of May, 1857, *f f* being the forward and outwardly projecting arms, and I the cross bar pivoted to them at *m*, *m*, and to the pole socket at *n*.

In Fig. 6, which is a bottom view of the forward part of the running gear, I show the mode of attaching these arms to the short axles by means of straps *g g* passing around and bolted to them. Plates H, H', of the form shown are attached to the underside of the bed C, and above the short axles *a a*. Against these plates the upper sides of the short axles play in their vibratory movements. In some cases I attach to the inner side of the plate, semicircular ways *b* in which the inner ends of the short axles slide and are supported. This is the arrangement shown in Figs. 5 and 6, with reference to plate H'. In other cases, as in that of plate H, the bolt *e* passes down through the bed C, the plate H and the axle *a*, and is secured at its lower extremity by two metallic straps *q* and *r* through which it passes and to which it is fastened by a nut as shown in Fig. 6.

In the case of plate H' the bolt *e* on which the short axle turns rises from the axle, passes through plate H' and bed C, and is secured by a nut at top to a transverse strap G bolted to brace F' and plate H'.

The plates H and H' are prevented from vibrating transversely about the bed C by means of the curved braces F, F', which are attached to their rear extremities to the perch D, extend forward to the plates H and H', and pass in a semicircular curve around their outer and upper edges, to which they are firmly bolted at *w* and *x*. In order to secure them still more firmly to the bed C, that bed is bent into a square shoulder at its ends *c* as shown clearly in Fig. 5, and receives the curved braces F, F' which are secured to it by bolts *i*, *i*. The plate H' is further secured to the bed C, by a stirrup *h*. By these arrangements the short axles receive a firm support in every position of the wheel, and are as little liable to be thrown out of place as the ordinary axle extending from wheel to wheel.

The transverse bar *l* is attached to the socket piece E, by a bolt *n* passing through both and having a nut on its lower end. As the bar varies in its distance from the bed C at every turn of the vehicle, it is necessary that the bolt *n* should have play in a slot. To prevent it from being rapidly worn by continued friction against the sides of the slot *o* I pass it through a sliding piece in which it fits snugly but so as to turn with ease. This slide moves in guides or ways in the slot *o* in the socket piece E. The arrangement will readily be understood by reference to Figs. 1, 2, and 6.

It is often desirable to attach the front spring to the forward end of the perch D at the point $d$. In this case a long king bolt is required, as seen in Fig. 4, and it is necessary to give it proper support. This I do by means of the straps or braces $j$, $k$, $v$ and $z$ attached to the ends of the king bolt by means of nuts. The straps $k$ and $v$, passing backward, are fixed at their rear ends to the perch D. The straps $j$ and $z$ are fixed at their forward ends to the socket piece E. I sometimes add a transverse strap $p$, Fig. 1, attached at its middle to the head of the bolt $d$ and fixed at its ends to the bed C as shown. When thus braced, the bolt $d$ may without objection be made long enough to pass through the lower part of the spring $s$ as shown in Fig. 4. The spring $s$ may be attached to the forward end of the perch D by means of a double stirrup $t$, $t$, as shown in top view in Fig. 3, and in section in Fig. 4.

Having thus described my improvements, what I claim and desire to secure by Letters Patent is—

1. The combination of the curved braces F, F', with the bed C and plates H, H', substantially in the manner and for the purpose described.

2. The combination with the bolt $n$ of the slide piece working in the slot $o$ in the manner and for the purpose specified.

The above specification of my invention signed and witnessed this 8th day of March 1860.

RICHD. MURDOCH.

Witnesses:
 CHAS. F. STANSBURY,
 EDW. F. BROWNE.